United States Patent
Sait

(10) Patent No.: US 11,474,767 B1
(45) Date of Patent: Oct. 18, 2022

(54) PRINT FROM WEB SERVICES PLATFORM TO LOCAL PRINTER

(71) Applicant: Amazon Technologies, Inc., Reno, NV (US)

(72) Inventor: Abdul Sathar Sait, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/289,406

(22) Filed: May 28, 2014

(51) Int. Cl.
*G06F 3/12* (2006.01)

(52) U.S. Cl.
CPC .......... *G06F 3/1284* (2013.01); *G06F 3/1211* (2013.01); *G06F 3/1268* (2013.01); *G06F 3/1286* (2013.01)

(58) Field of Classification Search
None
See application file for complete search history.

(56) References Cited

U.S. PATENT DOCUMENTS

| | | | | |
|---|---|---|---|---|
| 5,450,406 A * | 9/1995 | Esaki | ...................... | H04L 12/66 370/396 |
| 5,640,495 A * | 6/1997 | Colbert | ................. | G06F 3/1236 709/227 |
| 5,727,135 A * | 3/1998 | Webb | .................... | G06F 3/1204 358/1.14 |
| 6,370,602 B1 * | 4/2002 | Kumler | ................. | G06F 3/1248 710/33 |
| 6,453,129 B1 * | 9/2002 | Simpson | ................. | G06F 3/126 399/24 |
| 7,539,191 B1 * | 5/2009 | Jacobson | ............ | H04L 63/1441 370/392 |
| 8,612,559 B2 * | 12/2013 | Kuik | .................... | H04L 12/4641 709/221 |
| 8,918,858 B2 * | 12/2014 | Kivinen | ................ | H04L 67/568 726/14 |
| 2002/0140959 A1 * | 10/2002 | Harper | .................. | G06F 3/1207 358/1.14 |
| 2004/0193678 A1 * | 9/2004 | Trufinescu | ............ | G06F 3/1288 709/203 |

(Continued)

FOREIGN PATENT DOCUMENTS

| | | | |
|---|---|---|---|
| WO | WO 2013/147834 A1 * | 10/2013 | ............... G06F 3/12 |
| WO | WO-2013147834 A1 * | 10/2013 | ........... G06F 3/1205 |

OTHER PUBLICATIONS

"CubeX 3D Printing", Google message board, https://groups.google.com/forum/, accessed Jul. 7, 2014; 1 page.

(Continued)

Primary Examiner — Ted W Barnes
(74) Attorney, Agent, or Firm — BakerHostetler

(57) ABSTRACT

Techniques are disclosed for locally printing a print job generated by a remote web services platform. It may be that a local computer and an application of the remote web services platform that generates the print job lack a bidirectional communications link (like a VPN connection). A printer service on the web services platform presents itself as a printer to an application on the web services platform. The printer service receives a print job from the application and transmits it to a client-side print service. The client print service then sends the print job to a local printer.

24 Claims, 10 Drawing Sheets

(56) References Cited

U.S. PATENT DOCUMENTS

| | | | |
|---|---|---|---|
| 2004/0223182 A1* | 11/2004 | Minagawa | G06F 9/4411 358/1.15 |
| 2004/0249936 A1* | 12/2004 | Ishida | G06F 3/1205 709/224 |
| 2005/0162670 A1* | 7/2005 | Shuler | H04N 1/00408 358/1.2 |
| 2005/0210129 A1* | 9/2005 | Feng | G06F 3/1207 709/224 |
| 2005/0248805 A1* | 11/2005 | Shima | H04N 1/32635 358/1.15 |
| 2006/0026289 A1* | 2/2006 | Lyndersay | H04L 61/5014 709/227 |
| 2007/0005845 A1* | 1/2007 | Abe | G06F 3/123 710/62 |
| 2007/0076253 A1* | 4/2007 | Shima | G06F 3/1222 358/1.14 |
| 2007/0201078 A1* | 8/2007 | Morales | G06F 3/125 358/1.15 |
| 2008/0130661 A1* | 6/2008 | Jiang | H04L 12/18 370/401 |
| 2008/0313360 A1* | 12/2008 | Abe | G06F 3/1222 710/18 |
| 2009/0034738 A1* | 2/2009 | Starrett | H04L 63/162 380/278 |
| 2010/0073718 A1* | 3/2010 | Toma | G06Q 50/12 358/1.15 |
| 2010/0125903 A1* | 5/2010 | Devarajan | H04L 63/102 709/224 |
| 2011/0002004 A1* | 1/2011 | Rai | G06F 3/1211 358/1.15 |
| 2011/0055356 A1* | 3/2011 | Nonaka | G06F 3/1222 709/219 |
| 2011/0093366 A1* | 4/2011 | Nuggehalli | G06Q 30/0283 715/810 |
| 2011/0093940 A1* | 4/2011 | Dal Canto | H04L 63/0272 726/7 |
| 2011/0103394 A1* | 5/2011 | Vogt | H04L 61/2557 370/401 |
| 2011/0188080 A1* | 8/2011 | Chigusa | G06F 15/00 358/1.15 |
| 2011/0239291 A1* | 9/2011 | Sotka | H04L 63/1416 726/14 |
| 2011/0264779 A1* | 10/2011 | Noll | H04L 67/1097 709/223 |
| 2011/0313896 A1* | 12/2011 | Nuggehalli | G06Q 40/12 705/30 |
| 2011/0313950 A1* | 12/2011 | Nuggehalli | G06Q 30/02 709/219 |
| 2011/0314042 A1* | 12/2011 | Nuggehalli | G06F 3/0482 715/810 |
| 2012/0026539 A1* | 2/2012 | Ohara | G06F 3/1292 358/1.15 |
| 2012/0062946 A1* | 3/2012 | Kitagata | G06F 3/1204 358/1.15 |
| 2012/0092693 A1* | 4/2012 | Jaudon | G06F 3/122 358/1.13 |
| 2012/0110066 A1* | 5/2012 | Furuta | H04L 67/02 709/203 |
| 2012/0166582 A1* | 6/2012 | Binder | G06F 21/78 709/217 |
| 2012/0188583 A1* | 7/2012 | Stone | G06F 3/1288 358/1.14 |
| 2012/0212781 A1* | 8/2012 | Kohata | G06F 3/1285 358/1.15 |
| 2013/0003115 A1* | 1/2013 | Uchikawa | G06F 3/1288 358/1.15 |
| 2013/0036453 A1* | 2/2013 | Lyndersay | H04L 67/75 709/227 |
| 2013/0148155 A1* | 6/2013 | Kitagata | G06F 3/1287 358/1.15 |
| 2013/0201509 A1* | 8/2013 | Miyazawa | H04N 1/00244 358/1.13 |
| 2013/0235412 A1* | 9/2013 | Baldwin | G06F 3/1238 358/1.14 |
| 2013/0242335 A1* | 9/2013 | Naitoh | G06F 3/1238 358/1.14 |
| 2013/0301080 A1* | 11/2013 | Nakata | G06F 3/1204 358/1.15 |
| 2013/0321841 A1* | 12/2013 | Nakajima | H04N 1/4486 358/1.14 |
| 2014/0126418 A1* | 5/2014 | Brendel | H04L 49/70 370/254 |
| 2014/0201263 A1* | 7/2014 | Ohashi | H04L 67/00 709/203 |
| 2014/0226179 A1* | 8/2014 | Minagawa | G06F 3/1288 358/1.15 |
| 2014/0247459 A1* | 9/2014 | Maekawa | G06F 3/1238 358/1.14 |
| 2014/0268233 A1* | 9/2014 | Kawai | G06F 3/1288 358/1.15 |
| 2014/0280782 A1* | 9/2014 | Ohara | H04L 67/56 709/219 |
| 2014/0341598 A1* | 11/2014 | Kobayashi | G06F 3/121 399/45 |
| 2015/0009536 A1* | 1/2015 | Sparks | G06F 3/1232 358/1.15 |
| 2015/0116767 A1* | 4/2015 | Sasaki | H04N 1/00244 358/1.15 |
| 2015/0135302 A1* | 5/2015 | Cohen | H04L 63/1425 726/12 |
| 2015/0146020 A1* | 5/2015 | Imaizumi | H04N 19/167 348/222.1 |
| 2015/0156538 A1* | 6/2015 | Godbole | H04N 21/438 725/83 |
| 2015/0188780 A1* | 7/2015 | Spieser | H04L 43/12 370/252 |
| 2015/0212781 A1* | 7/2015 | Sasaki | G06F 3/1212 358/1.15 |
| 2015/0222787 A1* | 8/2015 | Sakiyama | H04N 1/32144 358/1.2 |
| 2015/0229790 A1* | 8/2015 | Sakurai | G06F 3/1259 348/207.2 |
| 2015/0294241 A1* | 10/2015 | Rozenfeld | G06Q 10/06 705/7.11 |
| 2016/0026623 A1* | 1/2016 | Blodgett | G06F 40/58 704/2 |
| 2017/0171182 A1* | 6/2017 | Yanacek | H04L 63/029 |

OTHER PUBLICATIONS

"VM—Virtual Machine"; http://www.desktop-virtualization.com/glossary/virtual-machine/; Desktop Virtualization; © 2022; accessed May 23, 2022; 5 pages.

"Virtual Machine"; https://en.wikipedia.org/wiki/Virtual_machine; Wikipedia; May 2022; accessed Mary 23, 2022; 7 pages.

\* cited by examiner

PRINT FROM WEB SERVICES PLATFORM TO LOCAL PRINTER

BACKGROUND

Some companies use cloud computing services to execute company applications. These company applications that are executed on a cloud computing service may produce output to be printed that the company wants printed on the company's premises.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

There are techniques for printing from a virtual machine (VM) instance that executes locally. There are also techniques for printing from a remote computer where there is a bidirectional communication link, such as a remote presentation session or a virtual private network connection (VPN), established between the remote computer and a local computer. A problem exists with printing locally from a remote computer where there is not a bidirectional communication link established.

Figure 1:
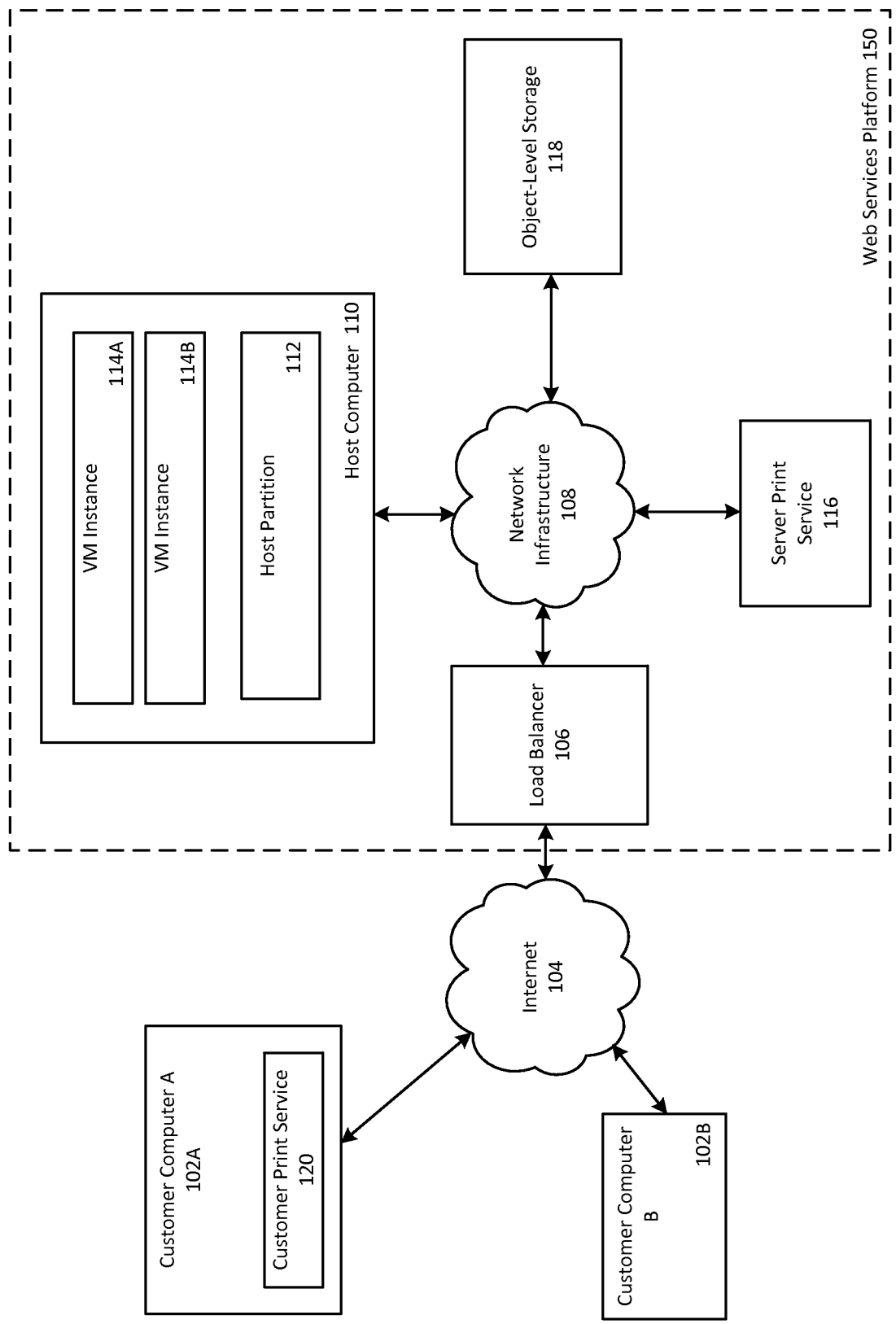
FIG. 1 depicts an example operating environment in which embodiments may be implemented.

Consider a scenario where a web services platform executes VM instances (this system architecture is described in more detail with respect to FIG. 1), and a customer of the web services platform executes a VM instance on the web services platform and wishes to print a print job generated by that remote VM instance to a local printer (such as a printer located "on prem"—on the customer's physical premises). For example, the remote VM instance may generate shipping labels for packages to be mailed, and the customer may desire to print these shipping labels where the packages are physically located, so that the shipping labels may be applied to the packages.

However, there may not be a bidirectional communication link between the customer's computer and the remote VM instance (there may be one between the customer and the web services platform as a whole, but not with the VM instance specifically). For example, for security purposes, the web services platform may present the customer with an Application Programming Interface (API) or a web page interface to perform tasks, such as starting and stopping the VM instance, but the customer may not be able to directly establish a remote presentation session or VPN connection with the VM instance. In the absence of this bidirectional communication link, there may be a problem with the customer computer communicating with the VM instance regarding commands to generate print jobs and with the customer computer receiving those print jobs from the VM instance.

In other embodiments, the VM instance may be configured to be part of a virtual private cloud that lacks an Internet gateway that permits the VM instance to communicate with another computer (like the customer computer) across the Internet. Or the customer may have a firewall configured for the VM instance or its own on-premises network that it does not want to open just to enable this printing. Or the network address (e.g., an Internet Protocol (IP) address) of the VM instance may otherwise be unroutable across a network to the customer computer.

It may be appreciated that the customer who wishes to print from a VM instance may not always be the entity that owns the VM instance. For example, the customer may have authorization to receive print jobs from the VM instance, but not have administrator access to start, stop, or modify the VM instance. In a software as a service (SaaS) scenario, a customer may be able to access an application via a web browser to send commands relating to printing, though that customer may be otherwise unable to access the VM instance that the application executes on.

A solution to this problem involves the use of two agents (herein, an agent may be implemented in hardware, software, or a combination thereof)—one installed on the customer computer (generally referred to herein as the customer print service or client print service) and the other installed on the web services platform (generally referred to herein as the server print service). The client print service may determine which local printers are present and inform the server print service of this. The server print service may provide a representation of these printers to the VM instance (so to the VM instance, it appears that these printers are network-accessible within the web services platform).

Then, the server printer service may receive print jobs that the VM instance intends to print to one of these printer representations and send the print job to the client printer service (after possibly encrypting and/or compressing the print job). The client print service may then (after possibly decrypting and decompressing the print job) send the print job to a local printer to be printed. In this manner, the customer may locally print a print job that is generated by a remote VM instance, even though the customer's local computer and the remote VM instance lack a bidirectional communications link.

The above is a high-level overview of these techniques. There are alternate embodiments and embodiments that provide more, or different, functionality, and these embodiments are described in the following figures. Additionally, while the embodiments generally deal with locally printing from a remote VM instance where there is no bidirectional communications link, it may be appreciated that these techniques may be applied to a situation of printing from a remote compute node (which may refer to a VM instance, or to a physical computer) where there is no bidirectional communications link.

FIG. 1 depicts an example operating environment in which embodiments may be implemented to locally print from an application that executes on a web services platform. Generally, the operating environment of FIG. 1 includes a multi-customer web services platform 150 that comprises multiple virtual machine instances executing on host computer 110 (the instances and host computers may both be described as being computing nodes, and there may be multiple instances of host computer 110), with a server print service 116 that works with a customer print service 120 to send print jobs generated by a virtual machine instance to customer computer A 102A to be printed at a local printer. In embodiments, server print service 116 may be a computing device that implements the one or more operating procedures of FIGS. 4-5 and 7, and customer print service 120 may be a computing device that implements the one or more operating procedures of FIGS. 3 and 6.

Customer computer A 102A and customer computer B 102B are computers possessed by customers, which are configured to access the web services platform 150 via a public network, e.g., Internet 104. In turn, the connection point between the multi-customer web services platform and Internet 104 is edge device 106. In embodiments, edge device 106 may be a gateway router. Within the multi-customer web services platform, edge device 106 connects to another computer network—network infrastructure 108. Network infrastructure 108 may be an intranet that is separate from Internet 104. Also connected to network infrastructure 108 are server print service 116, object-level storage 118, and host computer 110.

As depicted, web services platform 150 comprises host computer 110, which is configured to execute one or more virtual machine instances 114 (depicted here as VM instance 114A and VM instance 114B) and a host partition 112. While host computer 110 is depicted here as executing two VM instances 114, it may be appreciated that host computer 110 may execute more or fewer VM instances.

In embodiments, a customer directs the multi-customer web services platform to execute one or more VM instances on the customer's behalf. These VM instances may then execute to perform functions for the customer, such as a function of a web server for the customer's web site, or to perform compute functions, such as encoding video.

In addition to this aspect of the web services platform, customers may also store data in object-level storage 118. Object-level storage 118 is depicted as storing data as objects (e.g., a customer instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data. For example, as described in more detail herein below, server print service 116 may store data on object-level storage 118 that identifies printers belonging to a certain customer, and an indication of which applications or print jobs for a customer should be sent to which printer.

Figure 2:
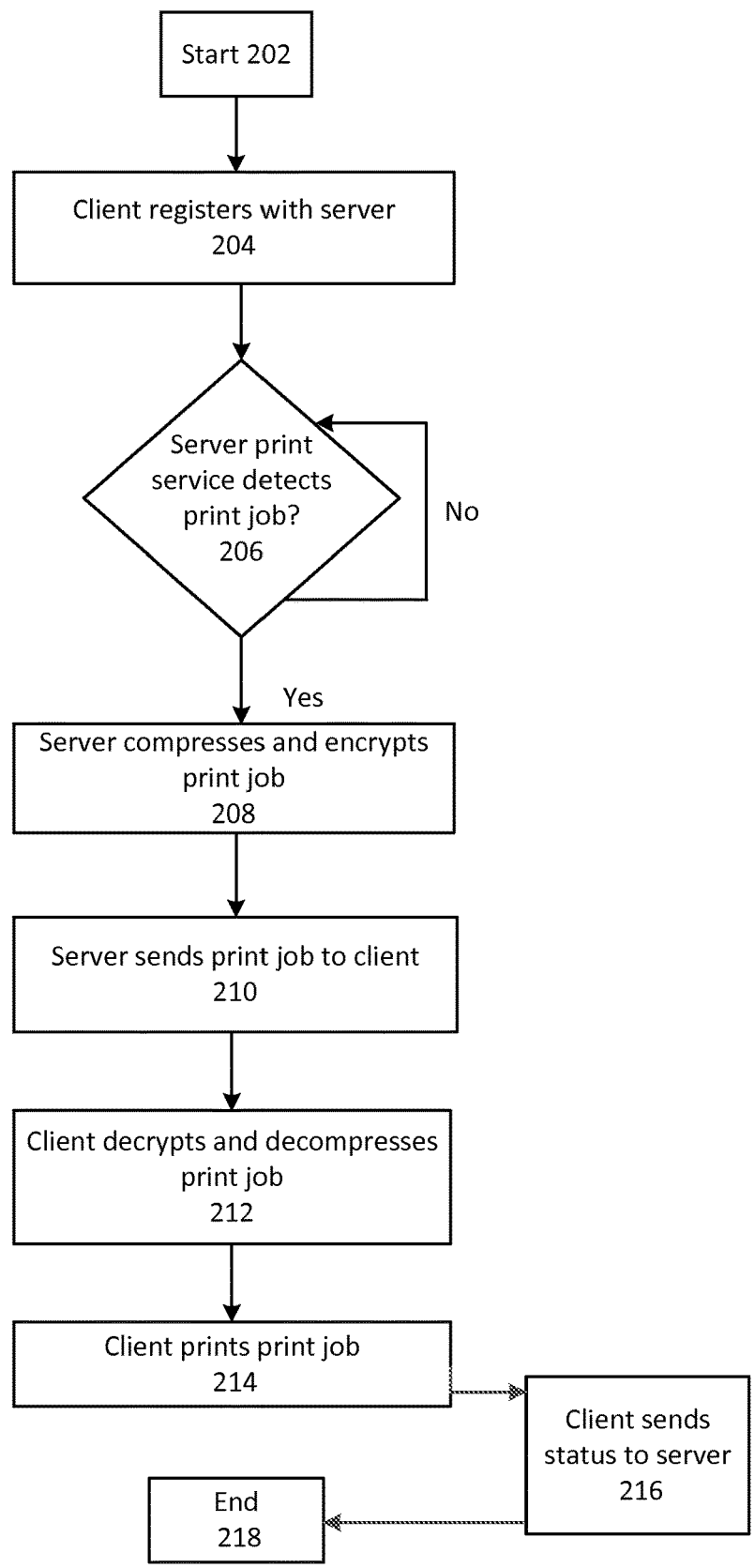
FIG. 2 depicts example operating procedures for a client and server where an application on the server prints locally to the client.

FIG. 2 depicts example operating procedures for a client and server where an application on the server prints locally to the client. The operating procedures of FIG. 2 provide a high-level overview of how a server and a client may work together. More detailed descriptions of the client and server occur in FIGS. 3-7. In embodiments, the operating procedures of FIG. 2 may be implemented by server print service 116 (where the server is web services platform 150) and customer print service 120 (where the client is customer computer A 102A) of FIG. 1 as a print job generated by an application executing on VM instance 114A is printed locally by customer computer A 102A.

It may be appreciated that there are embodiments that implement the depicted operations in a different order than is depicted in FIG. 2 (and FIGS. 3-7), or that implement more or fewer operations than are depicted in FIG. 2 (and FIGS. 3-7). For example, there may be embodiments that implement the depicted operations in a different order, such as where operation 206 is implemented before operation 204 and the server is waiting on a print job before the client registers with a server. There may also be operations that implement more or fewer operations than are depicted, such as embodiments that include an operation between operation 212 and 214 where the client determines which of multiple printers it should print the print job to.

The operating procedures of FIG. 2 begin with operation 202 and move to operation 204. Operation 204 depicts the client registering with the server. In embodiments, operation 204 may comprise customer print service 120 sending server print service 116 a message. This may comprise the client sending a registration message to the server in the form of one or more User Datagram Protocol (UDP), Hypertext Transfer Protocol (HTTP), or HTTP Secure (HTTPS) packets. This registration message may comprise, for example, an indication of the client's network address (such as an IP address), an indication (such as names) of one or more local printers that the client may print to, and an indication that the client is authorized to print print jobs generated by an application of the server. For example, where the client has a login and password associated with accessing the client's account on the server, this indication of authorization may comprise said login and password information. In embodiments, a client is restricted to receiving print jobs generated by a subset of server applications that the client has access to based on the client's account on the server (e.g., the client's own applications, but not those applications for another client). So, the server print service may verify that a user account associated with the client has permission to receive print jobs generated from the application.

In embodiments, and from the server's perspective, operation 204 may comprise receiving an identification of a printer of a remote client computer, the remote client computer lacking a bidirectional communications link with the VM instance on the web services platform. After operation 204, the operating procedures of FIG. 2 move to operation 206.

Operation 206 depicts the server print service detecting whether there is a print job. This may comprise the server print service providing a representation of the printers (e.g., a printer driver that identifies a printer as being network accessible within the web services platform) that were identified by the client print service to one or more applications executing on the web services platform that hosts the server print service. Then, when one of these applications sends a print job to the representation of a printer, that print job may be received by the server print service.

In other embodiments, the server print service may provide one representation of a printer to an application even though the server print service has access to multiple applications. The application sends print jobs to the one representation of a printer, and the server print service receives these print jobs and determines which of a plurality of accessible printers is to print the print job (and in embodiments, one print job may be printed at multiple printers).

In embodiments of operation 206 (and in other depicted operating procedures of the figures where an entity determines whether a message or print job is ready), communications between the client and server print service (or server print service and application that generates print jobs) may be effectuated by either a push or a pull architecture. For example, in embodiments, the server print service may query the application for print jobs, and in other embodiments, the application may send the print job to the server print service (by way of the representation of the printer) when a print job is ready.

Similarly, communications between the client and the server print service about the existence of a print job may be effectuated by either a push or a pull architecture. In embodiments, the server print service may send print jobs to the client when they are received from the application. In other embodiments, the server print service may queue up print jobs and send them to the client after the client sends the server a request for any print jobs that it may have queued up for the client.

Where the server print service does not detect that there is a print job, the operating procedures of FIG. 2 loop on operation 206 until the server print service does detect that there is a print job. Where the server print service does detect that there is a print job, the operating procedures of FIG. 2 move to operation 208.

Operation 208 depicts the server compressing and encrypting the print job. The server may compress the print job to conserve network bandwidth, and may encrypt the print job so that only the client may access the print job. The server may compress the print job via, for example, run-length encoding or with a dictionary-based compression scheme. The compression may be useful where a print job is large because the application believes that the printer is locally accessible, so conserving bandwidth is not a priority.

Additionally, the server may encrypt the print job via, for example, public key cryptography. The server may encrypt the print job with the client's public encryption key that the client makes publicly available to others. Then, the client decrypts the encrypted print job with its private key to produce the decrypted print job. The public and private keys are such that performing an operation on a file with either key will encrypt the file, which may then be decrypted by performing a similar operation on the file with the other of the two keys. After operation 208, the operating procedures of FIG. 2 move to operation 210.

Operation 210 depicts the server sending the print job to the client. This may occur in response to receiving the print job from the client, or in response to receiving a message from the client to print the print job. Sending the print job to the client may comprise the server print service sending the client the print job via a UDP, HTTP, or HTTPS connection.

In embodiments, the server print service may receive the print job in a generic format, a PostScript (PS) format, or a Printer Command Language (PCL) format, and modify the format of the print job to be specific to the printer that will print the print job. For example, the printer that will print the print job may be a PS printer. Where the server print service receives the print job in a generic format, it may convert the print job from this generic format to a PS format before sending it to the client. After operation 210, the operating procedures of FIG. 2 move to operation 212.

Operation 212 depicts the client decrypting and decompressing the print job. Where the server print service has encrypted and/or compressed the print job, as described in operation 208, operation 212 may comprise undoing these operations to obtain the original print job. For example, where the server compresses the print job with run-length encoding, run-length decoding may be used to decompress the print job. Similarly, where the print job is encrypted with the client's public key, the client may decrypt the print job using the client's private key. After operation 212, the operating procedures of FIG. 2 move to operation 214.

Operation 214 depicts the client printing the print job. This may comprise, the client sending the print job to a local printer in a similar manner as an application executing on the client would send a print job to that printer. After operation 214, the operating procedures of FIG. 2 move to operation 216.

Operation 216 depicts the client sending a status message to the server. This status message may comprise, for example, an indication that that print job was successfully printed, so that the server may delete the print job from a queue of print jobs that it maintains. This status message may also comprise an indication that there was an error with printing the print job, so the server should keep the print job in the queue because the client may be requesting it again. After operation 216, the operating procedures of FIG. 2 move to operation 218, where the operating procedures of FIG. 2 end.

Figure 3:
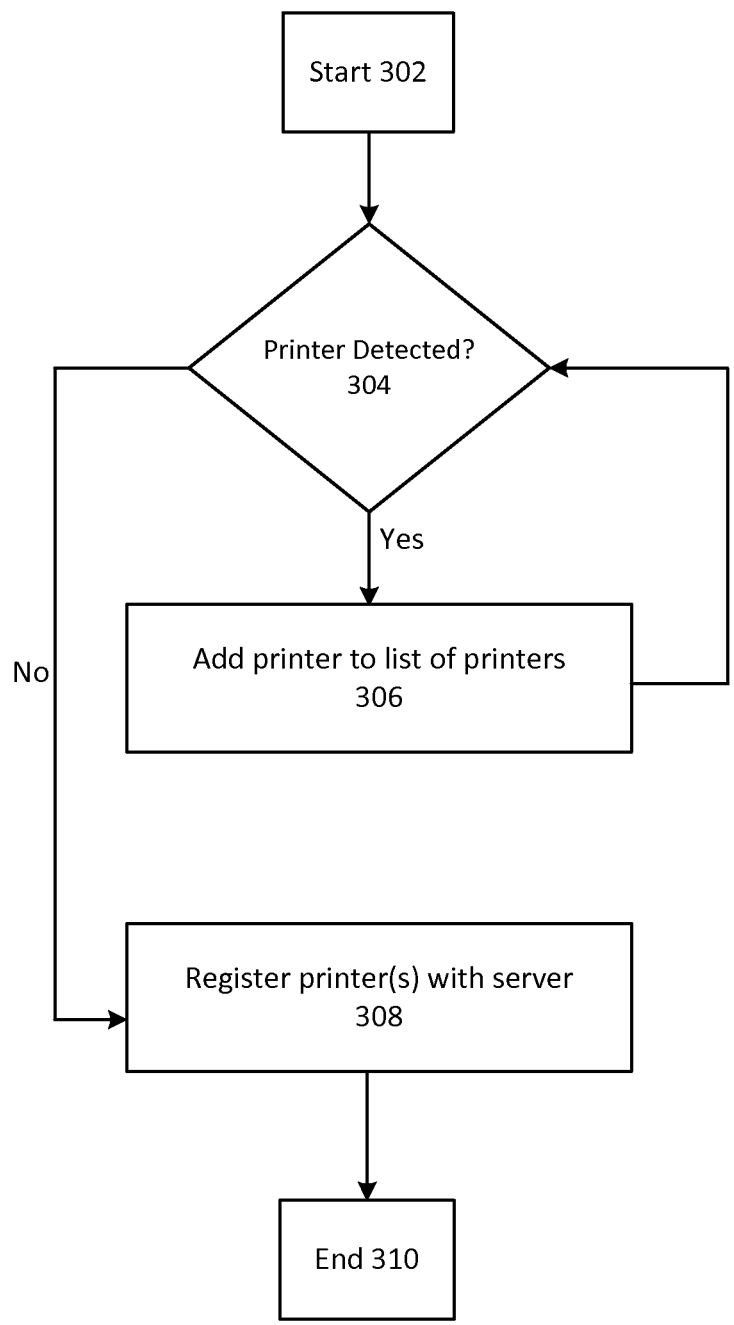
FIG. 3 depicts example operating procedures for a client registering one or more printers with a server.

FIG. 3 depicts example operating procedures for a client registering one or more printers with a server. In embodiments, the operating procedures of FIG. 3 may be implemented by customer print service 120 (as the client) to register one or more printers with server print service 116 of FIG. 1.

The operating procedures of FIG. 3 begin with operation 302 and move to operation 304. Operation 304 depicts determining whether a printer is detected. In embodiments, operation 304 may comprise the customer print service 120 determining which printers are accessible from customer computer A 102A, either by being connected to customer computer A 102A, such as via a Universal Serial Bus (USB) cable, or communicatively coupled to customer computer A 102A over a Local Area Network (LAN). Where a printer is detected, the operating procedures of FIG. 3 move to operation 306. Where a printer is not detected, the operating procedures of FIG. 3 move to operation 308.

Operation 306 depicts adding the detected printer to a list of printers. This may comprise storing an identification of the printer (such as its name, model number, or network address or USB port that it is accessible by) in a list. After operation 306, the operating procedures of FIG. 3 return to operation 304. In this manner, a loop of operations 304 and 306 may be performed to detect each printer that the client can detect and add each detected printer to a list of detected printers.

Operation 308 depicts registering the detected printer(s) with the server. Where the client registers the detected printer(s) with the server as part of the client registering with the server, this operation may be similar to operation 204 of FIG. 2 (where the server receives this registration from the client). Where the client has already registered with the server and is sending an indication of one or more new printers to register, this operation may also be similar to operation 204, or may also omit information specific to registering the client itself as an entity that has access to printers rather than a specific printer. This may comprise sending the list generated in operation 306 to the server print service 116.

After operation 308, the operating procedures of FIG. 3 move to operation 310, where the operating procedures of FIG. 3 end.

Figure 4:
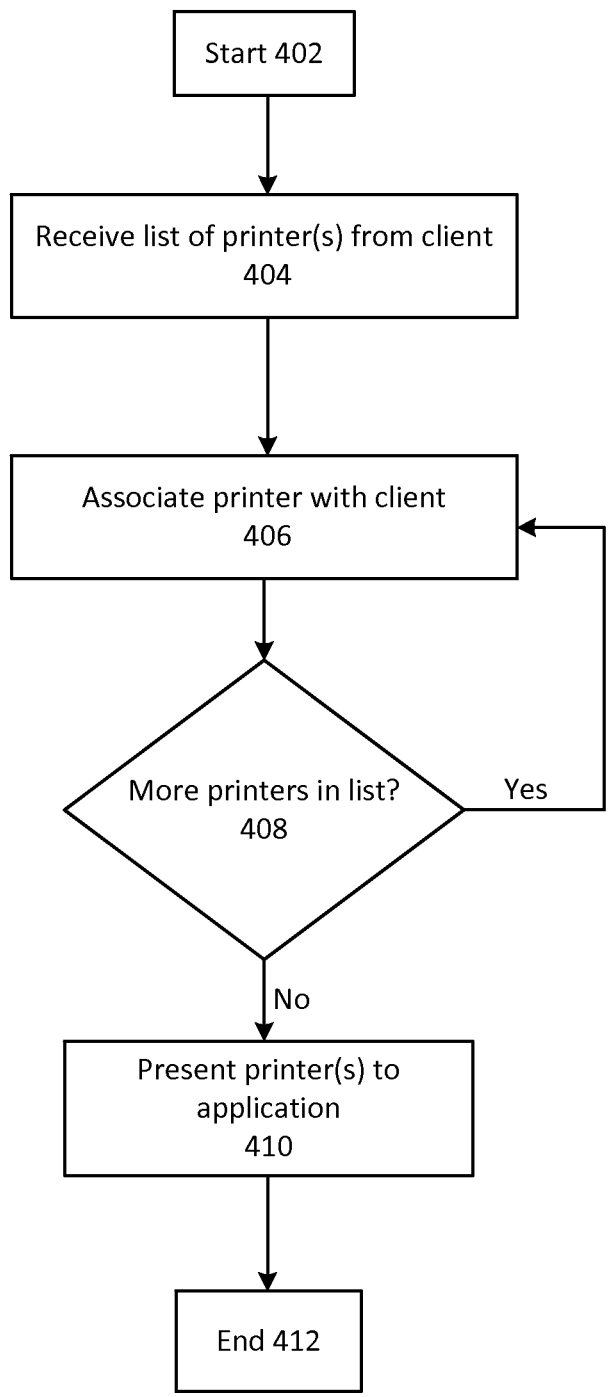
FIG. 4 depicts example operating procedures for a server processing printer information from a client and presenting one or more printers to an application executing on the server.

FIG. 4 depicts example operating procedures for a server processing printer information from a client and presenting one or more printers to an application executing on the server. In embodiments, the operating procedures of FIG. 4 may be implemented by server print service 116 of FIG. 1 as it communicates with customer print service 120.

The operating procedures of FIG. 4 begin with operation 402 and move to operation 404. Operation 404 depicts receiving a list of printer(s) from the client. In embodiments, operation 404 may be implemented similar to operation 308 of FIG. 3, which depicts the client registering the list of printer(s) with the server. After operation 404, the operating procedures of FIG. 4 move to operation 406.

Operation 406 depicts associating a printer in the list of printers with the client. This may comprise, for example, storing information in object-level storage 118 that indicates that this printer is associated with the client, so that, when a print job is to be sent to this printer, it is to be sent to the client. In embodiments, operation 406 may be described as storing an identification that a printer is associated with a remote client computer based at least in part on a received identification of the printer of the remote client computer. After operation 406, the operating procedures of FIG. 4 move to operation 408.

Operation 408 depicts determining whether there is an additional printer in the list of printers that has not been processed in operation 406. This may comprise, for example, reading lines from the list of printers (such as that produced in operation 306) from top to bottom, and determining if the end of the list has been reached yet, which indicates that there is not an additional printer in the list of printers that has not yet been processed in operation 406. Where it is determined that there is an additional printer in the list of printers that has not been processed in operation 406, the operating procedures of FIG. 4 return to operation 406. In this manner, a loop of operations 406 and 408 may be performed to associate each printer received in the list of printers with the client. Where it is determined that there is not an additional printer in the list of printers that has not been processed in operation 408, the operating procedures of FIG. 4 move to operation 410.

Operation 410 depicts presenting the printer(s) in the list of printers to an application. This may comprise presenting a representation of each printer to the applications of VM instance 114A in such a manner that the printers appear to those applications to be network-accessible printers that are located within web services platform 150. Then, after operation 410, the operating procedures of FIG. 4 move to operation 412, where the operating procedures of FIG. 4 end.

Figure 5:
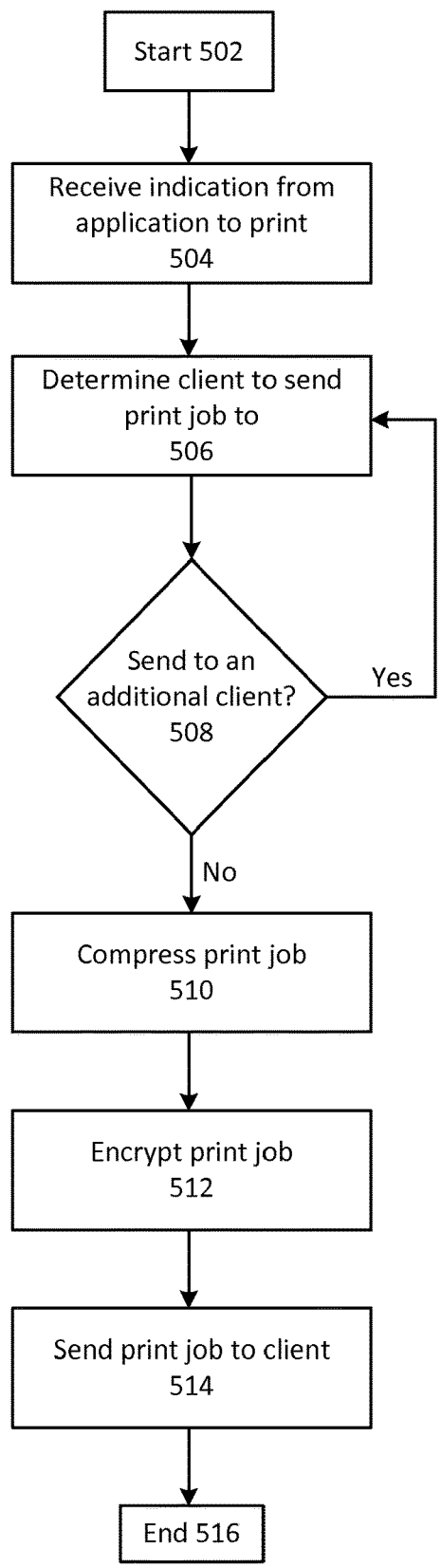
FIG. 5 depicts example operating procedures for a server gathering a print job and sending it to a client.

FIG. 5 depicts example operating procedures for a server gathering a print job and sending it to a client. In embodiments, the operating procedures of FIG. 5 may be implemented by server print service 116 of FIG. 1 as it communicates with customer print service 120.

The operating procedures of FIG. 5 begin with operation 502 and move to operation 504. Operation 504 depicts receiving an indication from the application to print, or, alternatively, receiving a print job from the application that is destined for the representation of the printer. In embodiments, this may comprise the application sending the print job to the representation of a printer provided to it in operation 410 of FIG. 4, and the server print service receiving this print job. After operation 504, the operating procedures of FIG. 5 move to operation 506.

Operation 506 depicts determining a client to whom the print job should be sent. In embodiments, this operation comprises accessing a stored association between the representation of the printer and a client (such as one maintained in object-level store 118), and determining the client based on the representation of the printer that received the print job. In embodiments, this comprises determining that the print job is to be sent to the remote client computer based at least in part on the stored identification that the printer is associated with the remote client computer. After operation 506, the operating procedures of FIG. 5 move to operation 508.

Operation 508 depicts determining whether to send the print job to an additional client. In embodiments, one representation of a printer may stand in for multiple printers on one client, or multiple clients that each will then print to one or more printers. For example, where purchase orders are to be printed as part of the print job, a purchase order print job may be sent to a location on the client's premises where shipping is performed, so the purchase order may be included with a shipment that is sent out. And, another purchase order print job may be sent to the accounting department of the client's premises, so that the client has paper copies of purchase orders to serve as a backup if it loses its electronic copies.

Where there is a stored association between a representation of the printer and a client, this stored association may comprise a representation of a printer and one or more clients, and operation 508 involves determining whether there are additional clients identified in this stored association. Where it is determined to send the print job to an additional client, the operating procedures of FIG. 5 return to operation 506. In this manner, a loop of operations 506 and 508 may be performed to determine to which client a print job is to be sent. Where it is determined not to send the print job to an additional client, the operating procedures of FIG. 5 move to operation 510.

Operation 510 depicts compressing the print job. In embodiments, compressing the print job in operation 510 may be performed in a similar manner as compressing the print job in operation 208 of FIG. 2. After operation 510, the operating procedures of FIG. 5 move to operation 512.

Operation 512 depicts encrypting the print job. In embodiments, encrypting the print job in operation 512 may be performed in a similar manner as encrypting the print job in operation 208 of FIG. 2. After operation 512, the operating procedures of FIG. 5 move to operation 514.

Operation 514 depicts sending the print job to the client(s). This may be done in response to determining that the print job is to be sent to a particular client(s). This may comprise sending each client the print job via a UDP, HTTP, or HTTPS connection. In embodiments where the client may print to multiple printers and has registered these multiple printers with the server print service, this may comprise also sending the client an indication of which printer or printers to print the print job to.

In embodiments, the server may break up, or divide, the print job and send it to the client in segments. For example, without breaking up the print job, first the application in the VM instance may need to create the entire print job and send it to the server print service. Once the server print service has the entire print job, it may then be possible to send the print job to the client. Where the print job is particularly large, such as 10,000 mailing labels, this may introduce latency, because just generating the print job before it is sent may take some time. Using this example of 10,000 mailing labels, with segmenting the print job, the server print service may send a new group of 100 mailing labels—a segment of the 10,000 mailing labels—to the client when they are generated.

There may be embodiments where the order that the mailing labels (or portions of some other print job) are received by the client do not matter. For example, the mailing labels may be affixed to otherwise identical copies of a magazine that is to be mailed. In embodiments where a process on the server is aware of whether order matters, the server may send the client an indication of whether or not order matters along with the segments.

In embodiments where order does not matter, and the client has access to multiple printers, the client may receive the indication that order does not matter, and in response, split the various segments among the plurality of printers, such as by sending a received segment to a printer that has a smallest current print queue (or that has the nearest expected time of being finished with its current print queue). In other embodiments, where the client determines that order does not matter and has access to multiple printers, the client print service may sub-divide a single received segment into multiple sub-segments, and send these different sub-segments to different printers. In this manner, a print job where order does not matter may be printed more rapidly by using multiple printers.

There also may be embodiments where the order that the client receives the mailing labels does matter—for example where customers have ordered different goods from a business, and the order of the mailing labels being generated coincides with an order of boxes of different goods being sent down a conveyor belt. In this latter case where order does matter, the server and client may communicate as to the order of the segments. For example, each segment that the client sends the server may include both the print job and metadata that indicates which numbered segment it is. In embodiments, this metadata may also include a total number of segments to be sent. Where the client receives the segments out of order (e.g., segment #2 is received before segment #1), then the client may store the segment(s) in a queue until the preceding segment(s) are received and processed (here, where segment #1 is received and processed by printing those mailing labels and affixing them to the proper boxes). In other embodiments, the client may send the segment information separately from the print job segment, and the segment information may identify the print job segment that the segment information refers to by, e.g., a checksum of the print job. Then the client may perform a checksum on each print job segment it receives, and where that checksum is the same as a checksum identified in the segment information, the client may associate that print job segment with that segment information.

In embodiments, a segment size—a number of pages, mailing labels, or other items—in a print job segment may be determined by an administrator of the server. In other embodiments, the client may send an API command to set the segment size, using an API command similar to those described with respect to FIG. 7. The client may also send an API command to the server that specifies whether the order of the segments matters.

In embodiments, the segment size may be dynamically changed, and/or determined automatically. For example, the segment size may be determined based on factors such as the speed at which an application generates the print job (e.g., measured in pages per minute, and which may vary based on the complexity of the print job), the speed at which a printer may print a print job, and bandwidth between the server print service and the client. In embodiments, the client may send an acknowledgement message to the server (using an API command similar to those described with respect to FIG. 7) when it has completed printing a segment.

The server print service may use this information to determine how long it takes the client to print a print job from when the server sends the print job, and use this information to determine the segment size, and/or how long to wait between until sending another segment. For example, where the server print service receives an acknowledgement from the client that it has printed a segment 5 minutes after it was sent the segment, the server print service may determine to send future segments slightly fewer than 5 minutes apart, so that the client should always have more of the print job to print, until it has completed printing the print job. In embodiments, these aspects of changing the segment size and when segments are sent may be selected or not selected by a customer, such as by sending an API command to the server indicative of the customer preference.

After operation 514, the operating procedures of FIG. 5 move to operation 516, where the operating procedures of FIG. 5 end.

Figure 6:
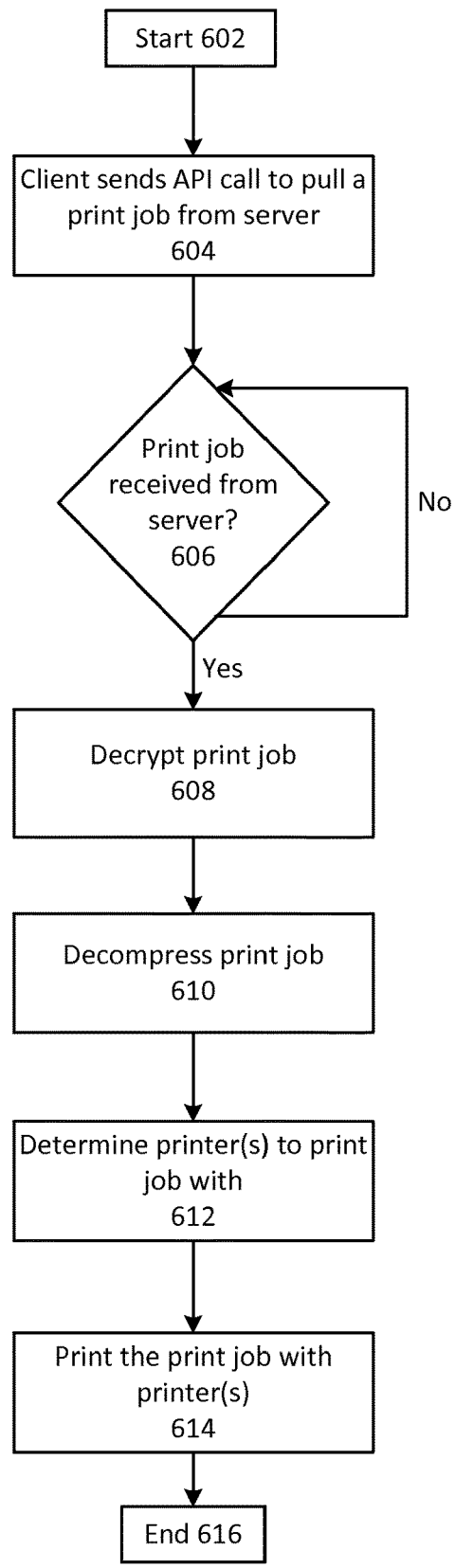
FIG. 6 depicts example operating procedures a client receiving a print job from a server and printing it to a local printer.

FIG. 6 depicts example operating procedures of a client receiving a print job from a server and printing it to a local printer. In embodiments, the operating procedures of FIG. 6 may be implemented by customer print service 120 (as the client) to receive a print job from server print service 116 of FIG. 1 and then print said print job.

The operating procedures of FIG. 6 begin with operation 602 and move to operation 604. Operation 604 depicts the client invoking an API call to pull a print job from the server. In embodiments, this API call may be similar to the API call to print described with respect to operation 706 of FIG. 7. After operation 604, the operating procedures of FIG. 6 move to operation 606.

Operation 606 depicts determining whether the print job has been received from the server. In embodiments, this may comprise determining whether data from the server print service has been received on a predetermined port (e.g., port 81 for UDP traffic). Where it is determined that the print job has not been received from the server, the operating procedures of FIG. 6 loop on operation 606 until the print job has been received from the server. Where it is determined that the print job has been received from the server, the operating procedures of FIG. 6 move to operation 608.

Operation 608 depicts decrypting the print job. In embodiments, operation 608 may be implemented in a similar manner as decrypting is implemented in operation 212 of FIG. 2. After operation 608, the operating procedures of FIG. 6 move to operation 610.

Operation 610 depicts decompressing the print job. In embodiments, operation 608 may be implemented in a similar manner as decompressing is implemented in operation 212 of FIG. 2. After operation 610, the operating procedures of FIG. 6 move to operation 612.

Operation 612 depicts determining one or more printers with which to print the print job. In embodiments, this comprises receiving an indication of which printer to print the print job along with the print job from the server print service, and identifying the printer based on that received indication. In embodiments where the client has registered only one printer with the server print service, the client may identify the printer to print the print job with as this one printer that has been registered already. After operation 612, the operating procedures of FIG. 6 move to operation 614.

Operation 614 depicts printing the print job with the one or more printers determined in operation 612. This may comprise the client print service sending the print job to the printer in a manner similar to the way that another application executing on customer computer A 102A would send a print job to that printer. After operation 614, the operating procedures of FIG. 6 move to operation 616, where the operating procedures of FIG. 6 end.

Figure 7:
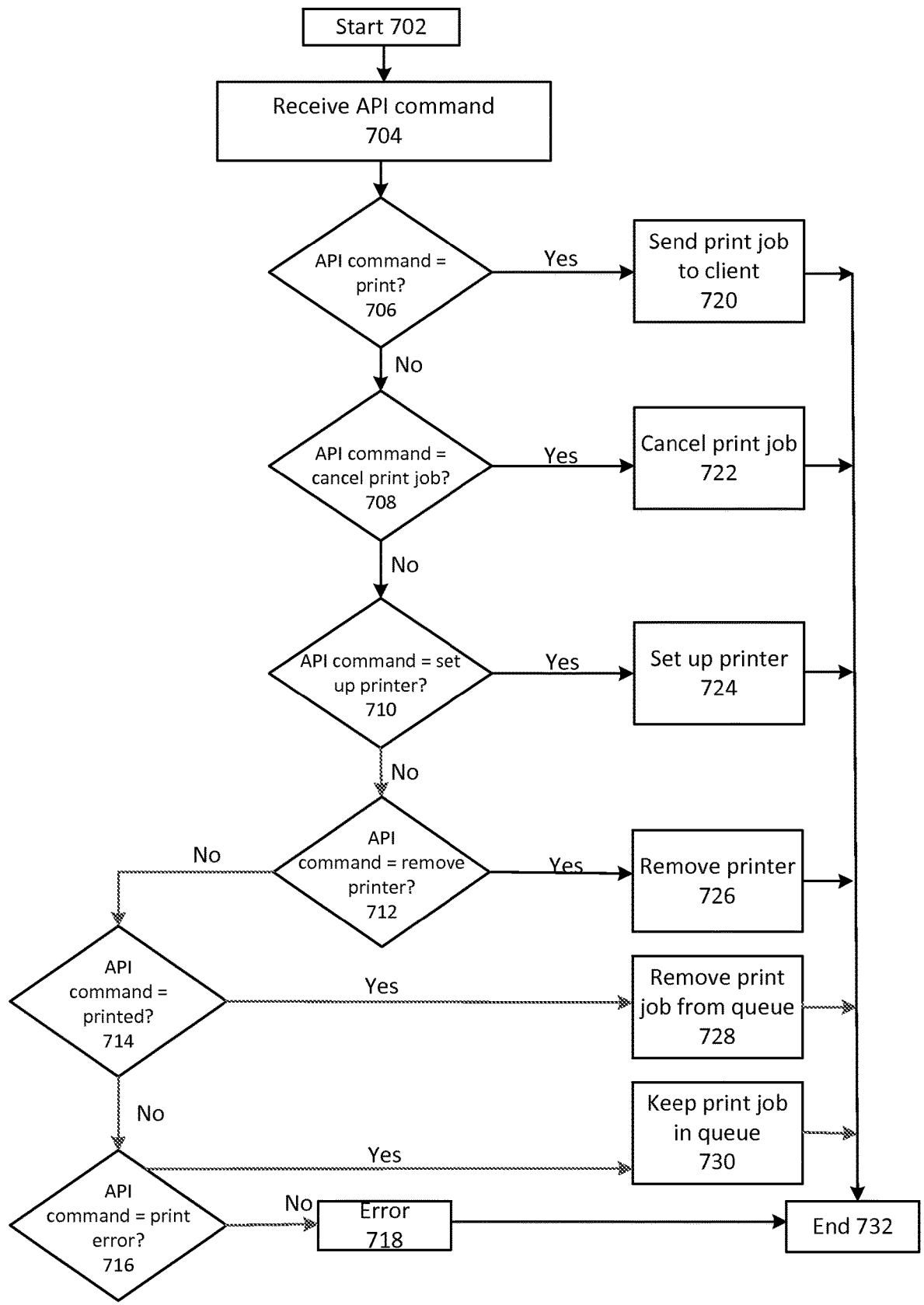
FIG. 7 depicts example operating procedures for a server processing an API call from a client that relates to printing.

FIG. 7 depicts example operating procedures for a server processing an API call from a client that relates to printing. In embodiments, the operating procedures of FIG. 7 may be implemented by server print service 116 of FIG. 1 as it receives an API call from customer print service 120.

The operating procedures of FIG. 7 begin with operation 702 and move to operation 704. Operation 704 depicts receiving an API command from the client. In embodiments, this API call may comprise a request to access a web page on the server, similar to how a person may enter a URL into a web browser's location bar and press Enter to navigate to that URL. In embodiments, a hostname portion of the URL may identify the VM instance that the print command is in reference to, and a query string of the URL may identify a command and parameters for that command. For example, in the URL VMinstanceA.[[host]].com/?cmd=print, "VMinstanceA" may identify the instance that the command is in reference to (here, VM instance A 114A), and the query string—the portion after the question mark—may identify the command. Here, that command is to print. After operation 704, the operating procedures of FIG. 7 move to operation 706.

Operation 706 depicts determining whether the API call indicates a command to print a print job. Using the API command described above, the URL may be parsed, and where the query string is "cmd=print," then it may be determined that the command is to print. There may be additional parameters in the query string, such as "cmd=print&size=lessthan50" where the parameter "size=lessthan50" may indicate to print all print jobs that are no greater than 50 pages. Where it is determined in operation 706 that the API call indicates a command to print a print job, the operating procedures of FIG. 7 move to operation 716. Where it is determined in operation 706 that that API call does not indicate a command to print a print job, the operating procedures of FIG. 7 move to operation 708.

Operation 708 depicts determining whether the API call indicates a command to cancel a print job. Using the API command described above, the URL may be parsed, and where the query string is "cmd=cancel," then it may be determined that the command is to cancel the current print job, or alternatively, all print jobs for the client. There may be additional parameters in the query string, such as "cmd=cancel&printjobid=001" where the parameter "printjobid=001" may indicate that the print job with ID "001" is to be cancelled. Where it is determined in operation 708 that the API call indicates a command to cancel a print job, the operating procedures of FIG. 7 move to operation 718. Where it is determined in operation 708 that that API call does not indicate a command to cancel a print job, the operating procedures of FIG. 7 move to operation 710.

Operation 710 depicts determining whether the API call indicates a command to set up a printer. Using the API command described above, the URL may be parsed, and where the query string is "cmd=setup," then it may be determined that the command is to set up a printer for the client. Where there is no information about the client printer to be set up added in a parameter, a generic printer may be established for the client by server print service, where server print service is aware that the client is capable of printing print jobs without additional information (like the presence of multiple printers, or whether the printer is a color printer). There may be additional parameters in the query string, such as "cmd=setup&printertype=001" where the parameter "printertype=001" may indicate that the printer is of a type identified by "001" (where "001," may, for example, indicate a color and duplex printer that may print 30 sheets per minute). In other embodiments the identification of the printer contained within the query string may comprise a pointer to a memory location where information about the printer is stored on the server or elsewhere, or a token that identifies the information about the printer that is already stored on the server or elsewhere.

Where it is determined in operation 710 that the API call indicates a command to set up a printer, the operating procedures of FIG. 7 move to operation 720. Where it is determined in operation 710 that that API call does not indicate a command to set up a printer, the operating procedures of FIG. 7 move to operation 712.

Operation 712 depicts determining whether the API call indicates a command to remove a printer. Using the API command described above, the URL may be parsed, and where the query string is "cmd=remove," then it may be determined that the command indicates that the printer is not available for printing, and to remove a previously setup printer, or alternatively, all printers for the client. There may be additional parameters in the query string, such as "cmd=remove&printerid=001" where the parameter "printerid=001" may indicate that the printer with ID "001" is to be cancelled (for example, the printer with ID "001" may be the first printer that the client had the server print service set up).

Where it is determined in operation 712 that the API call indicates a command to remove a printer, the operating procedures of FIG. 7 move to operation 722. Where it is determined in operation 712 that that API call does not indicate a command to remove a printer, the operating procedures of FIG. 7 move to operation 714.

Operation 714 depicts determining whether the API call indicates a command that states that the client successfully printed the print job. The client may send the server this command when the client determines that the print job was successfully printed, such as when the client receives an indication from the printer(s) used to print the print job that the print job was successfully completed. Using the API command described above, the URL may be parsed, and where the query string is "status=success," then it may be determined that the print job was printed successfully. Where it is determined in operation 714 that the API call indicates a command that states that the client successfully printed the print job, the operating procedures of FIG. 7 move to operation 728. Where it is determined in operation 714 that that API call does not indicate a command that states that the client successfully printed the print job, the operating procedures of FIG. 7 move to operation 716.

Operation 716 depicts determining whether the API call indicates a command that states that the client did not successfully print the print job. The client may send the server this command when the client determines that the print job was did not successfully print, such as when the client receives an indication from the printer(s) used to print the print job that there was an error associated with printing the print job (such as the printer ran out of paper or ink). Using the API command described above, the URL may be parsed, and where the query string is "status=failure," then it may be determined that the print job was printed successfully. Where it is determined in operation 716 that the API call indicates a command that states that the client did not successfully print the print job, the operating procedures of FIG. 7 move to operation 730. Where it is determined in operation 716 that that API call does not indicate a command that states that the client did not successfully print the print job, the operating procedures of FIG. 7 move to operation 718.

Operation 718 depicts raising an error. An error may be raised where no known API command has been issued. For example, the query string may read "cmd=foobar" where "foobar" is not a recognized command. In this instance, an error may be raised where an administrator of web services platform 150 is alerted and/or the client is notified that the command was not recognized. In embodiments, this error may be sent via email. After operation 718, the operating procedures of FIG. 7 move to operation 732, where the operating procedures of FIG. 7 end.

Operation 720 depicts sending a print job to the client and is reached from operation 706 where it is determined that the API call indicates a command to print a print job. In embodiments, this may comprise sending the print job to the client in a manner similar to that described with respect to operation 514 of FIG. 5. After operation 720, the operating procedures of FIG. 7 move to operation 732, where the operating procedures of FIG. 7 end.

Operation 722 depicts cancelling a print job and is reached from operation 708 where it is determined that the API call indicates a command to cancel a print job. Where the server has already started sending the print job to the client, this may comprise ceasing to send the print job from the client and possibly sending the client an indication that the print job was cancelled. Where the print job is stored by the server print service in a queue, cancelling the print job may comprise deleting the print job from this queue. After operation 722, the operating procedures of FIG. 7 move to operation 732, where the operating procedures of FIG. 7 end.

Operation 724 depicts setting up a printer and is reached from operation 710 where it is determined that the API call indicates a command to set up a printer. In embodiments, this may comprise presenting a representation of the printer to one or more applications, similar to as described in operation 206 of FIG. 2. After operation 724, the operating procedures of FIG. 7 move to operation 732, where the operating procedures of FIG. 7 end.

Operation 726 depicts removing a printer from a list of available printers and is reached from operation 712 where it is determined that the API call indicates a command to remove a printer. Where the representation of the printer is presented to one or more applications similar to operation 206 of FIG. 2, this may comprise removing the representation of the printer. For example, if an application queries for a list of all network accessible printers, where the printer has been removed from the list of available printers, this query may not result in receiving an identification of this now-removed printer. After operation 726, the operating procedures of FIG. 7 move to operation 732, where the operating procedures of FIG. 7 end.

Operation 728 depicts removing a print job from a queue maintained by the server, and is reached from operation 714 where it is determined that the API call indicates a command that states that the client successfully printed the print job. After operation 728, the operating procedures of FIG. 7 move to operation 732, where the operating procedures of FIG. 7 end.

Operation 730 depicts keeping a print job from a queue maintained by the server, and is reached from operation 7176 where it is determined that the API call indicates a command that states that the client did not successfully print the print job. In embodiments, the server may delete print jobs from the queue after a set amount of time has elapsed, unless the client sends a message indicating that the print job was not successfully printed. Where the client does send a message indicating that the print job was not successfully printed, the server may keep the print job in the queue until the client does send a message indicating that the print job was successfully printed, because the client may have lost its copy of the print job and need a new copy from the server. After operation 730, the operating procedures of FIG. 7 move to operation 732, where the operating procedures of FIG. 7 end.

Figure 8:
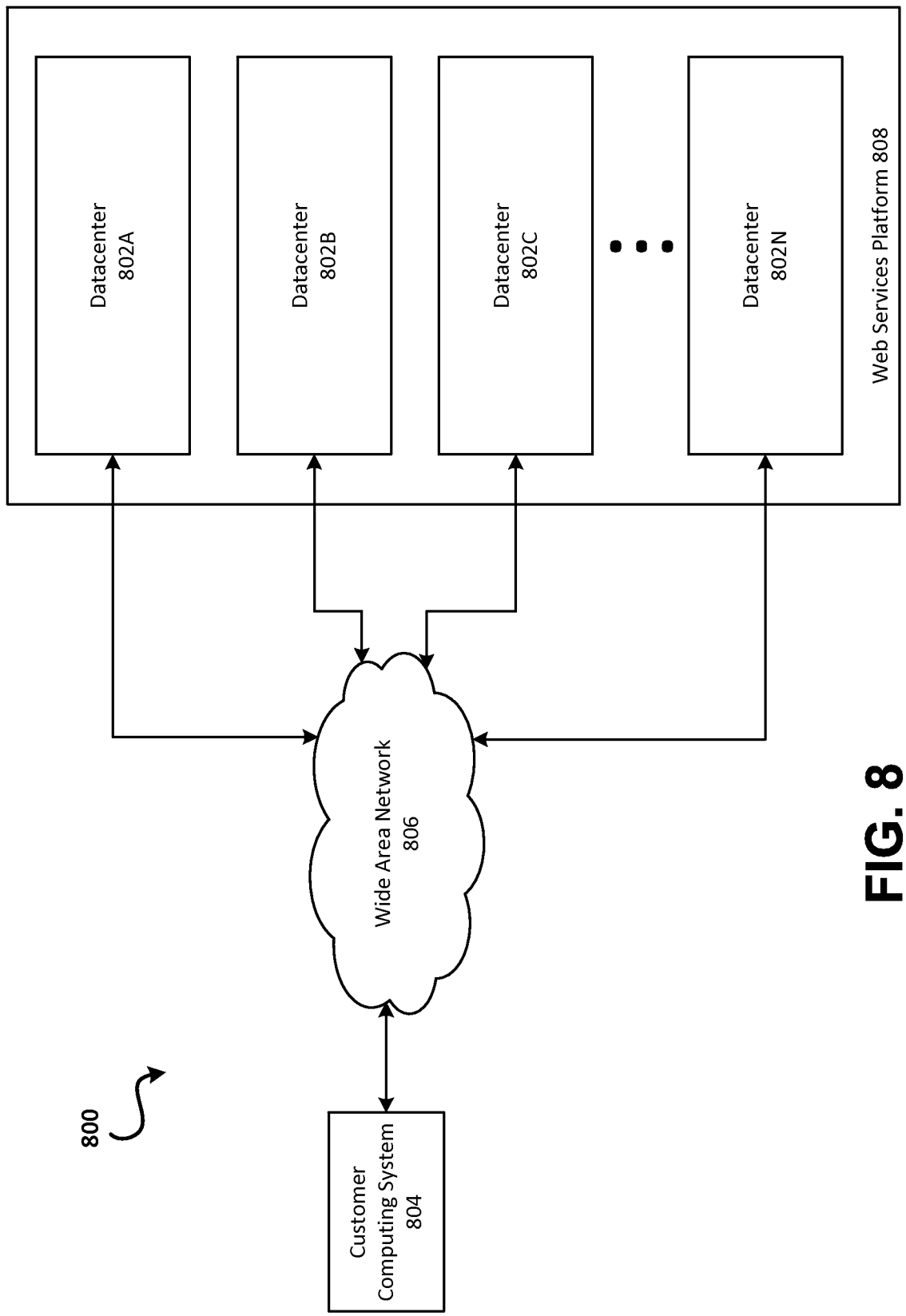
FIG. 8 depicts a web services platform, such as in FIG. 1, that comprises a plurality of datacenters.
Figure 9:
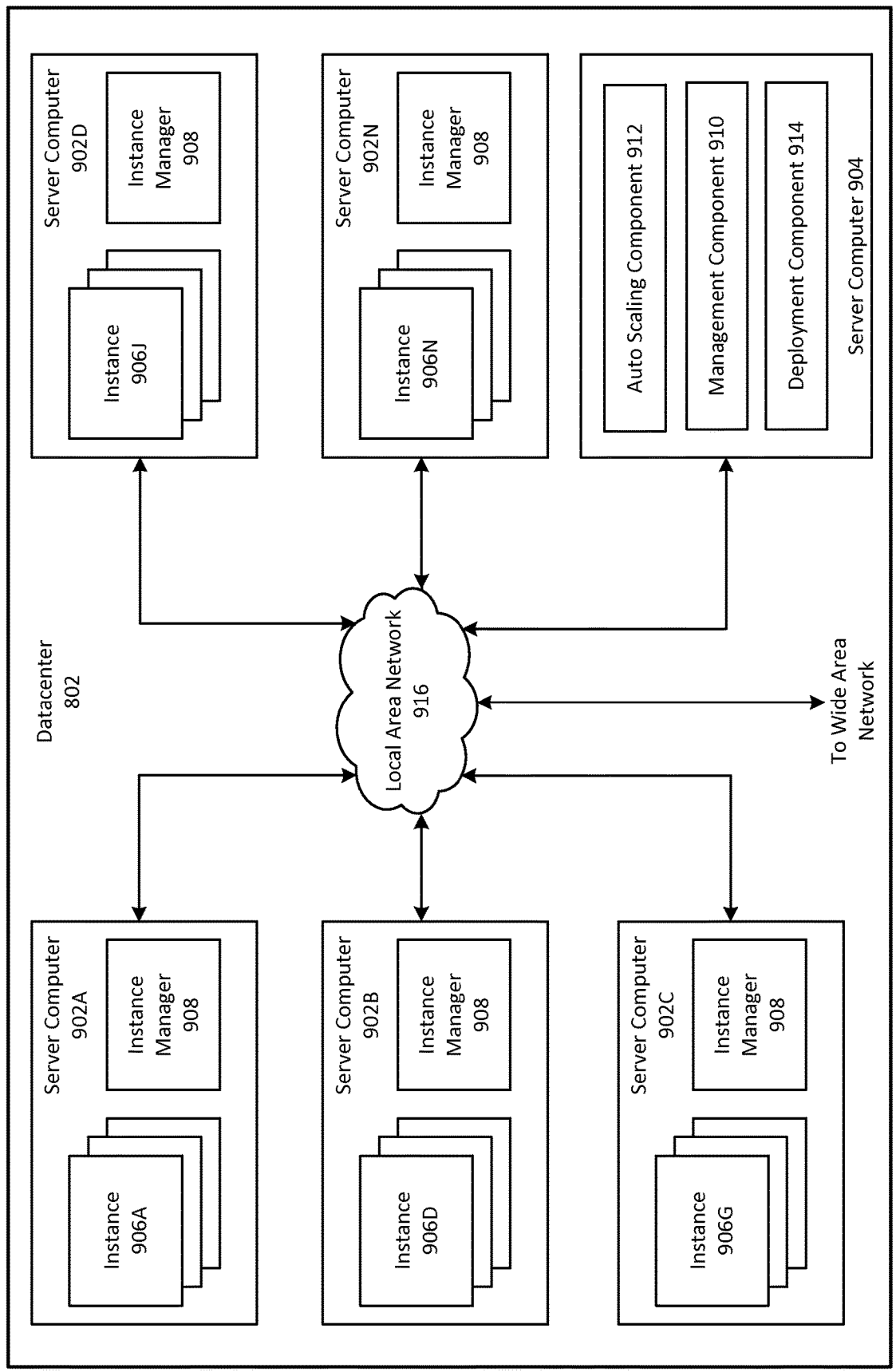
FIG. 9 depicts a datacenter, such as in FIG. 8, that comprises a plurality of computers.
Figure 10:
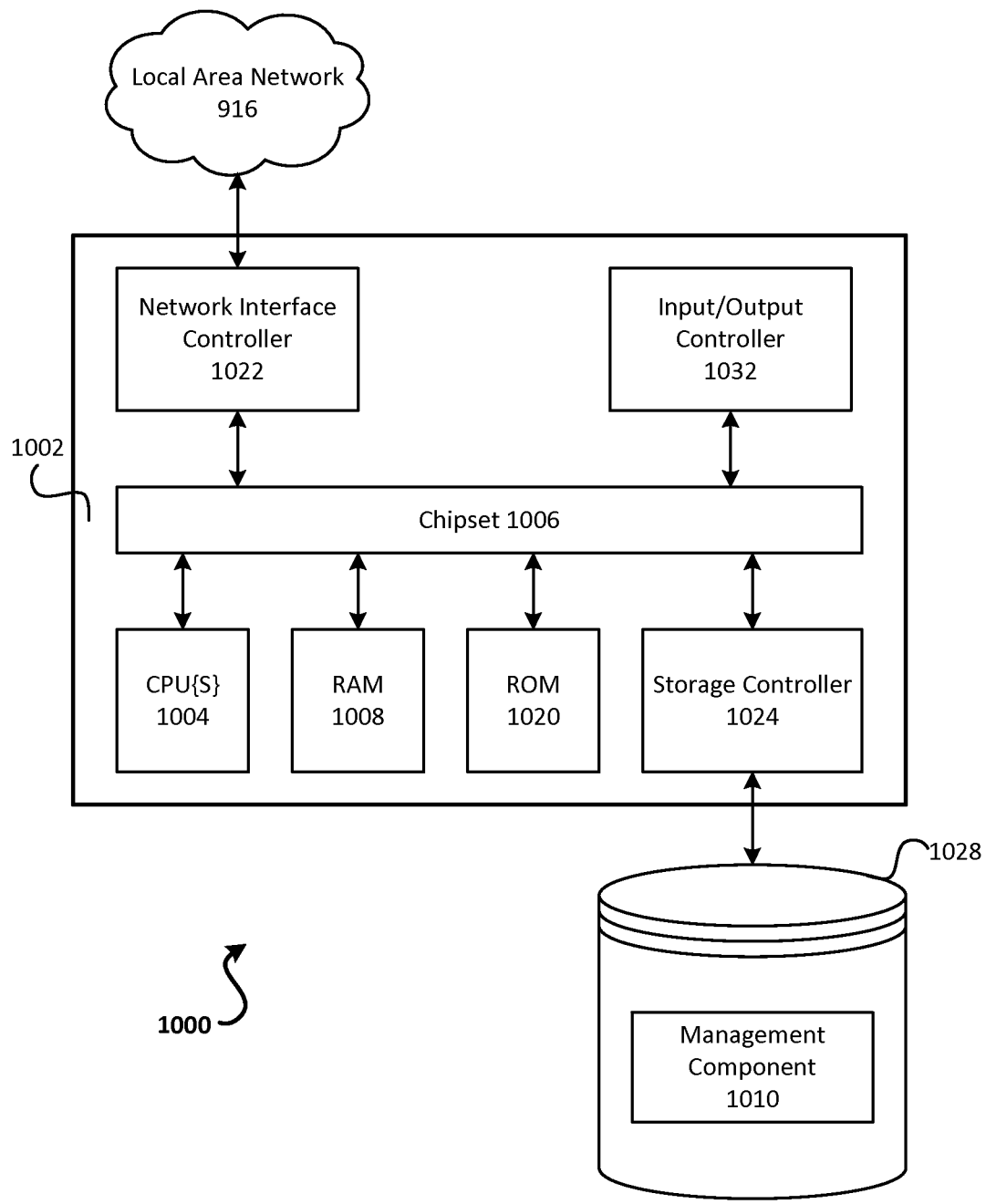
FIG. 10 depicts a computer that may be part of a datacenter, such as in FIG. 9.

FIGS. 8-10 are similar to FIG. 1 in that they depict example operating environments in which embodiments disclosed herein may be implemented, and said figures depict these operating environments at varying levels of granularity. FIG. 8 generally depicts a web services platform that comprises a plurality of datacenters. FIG. 9 generally depicts a datacenter that comprises a plurality of computers. FIG. 10 generally depicts a computer that may be part of a datacenter.

It may be appreciated that the operating environments of FIGS. 8-10 may be used to implement aspects of the operating environment of FIG. 1. For example, edge device 106, host computer 110, and route optimizer 116 may be implemented in a datacenter 802A of FIG. 8, or across multiple datacenters 802A, 802B, 802C, and/or 802N of FIG. 8. Likewise, Internet 104 of FIG. 1 may be Wide Area Network 806 of FIG. 8, and customer computer A 102A and customer computer B 102B may each be customer computing system 804 of FIG. 8. Additionally, web services platform 150 may be implemented as web services platform 808.

Turning now to details of FIG. 8, this figure depicts an example of a suitable computing environment in which embodiments described herein may be implemented. A cloud service provider (such as web services platform 808) may configure the illustrated computing environment to host virtual clouds of entities and to enable communication paths between these virtual clouds that may otherwise be isolated. In particular, FIG. 8 is a system and network diagram that shows an illustrative operating environment 800 that includes a web services platform 808 for implementing virtual clouds and for providing on-demand access to compute resources, such as virtual machine instances. Web services platform 808 can provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as Web servers and/or one large processing resource as a database server, for example.

The compute resources provided by web services platform 808 may be enabled by one or more datacenters 802A-802N, which may be referred herein singularly as "datacenter 802" or in the plural as "datacenters 802." Datacenters 802 may be facilities that house and operate computer systems and associated components and may include redundant and backup power, communications, cooling, and security systems. Datacenters 802 may be located in a same geographical area, such as in a same facility, and may be interconnected using private networks, such as high-speed fiber optic networks, controlled and managed by a service provider of web services platform 808. Datacenters 802 may also be distributed across geographically disparate locations and may be interconnected in part using public networks, such as the Internet. One illustrative configuration for datacenter 802 that implements the concepts and technologies disclosed herein is described below with regard to FIG. 9.

Entities of web services platform 808 may access the compute resources provided by datacenters 802 over a Wide Area Network (WAN) 806. Although a WAN is illustrated in FIG. 8, it should be appreciated that a Local Area Network (LAN), the Internet, or any other networking topology known in the art that connects datacenters 802 to remote entities and other users may be utilized. It should also be appreciated that combinations of such networks may also be utilized.

An entity or other entities that are customers of web services platform 808 may utilize a computing system 804 to access the compute resources provided by datacenters 802. Customer computing system 804 comprises a computer capable of accessing web services platform 808, such as a server computer, a desktop or laptop personal computer, a tablet computer, a wireless telephone, a PDA, an e-reader, a game console, a set-top box, or any other computing node.

As is described in greater detail below, customer computing system 804 may be utilized to configure aspects of the compute resources provided by web services platform 808. In this regard, web services platform 808 may provide a web interface through which aspects of its operation may be configured through the use of a web browser application program executing on customer computing system 804. Alternatively, a stand alone application program executing on customer computing system 804 may access an application programming interface (API) exposed by web services platform 808 for performing the configuration operations. Other mechanisms for configuring the operation of web services platform 808, including launching new virtual machine instances on web services platform 808, may also be utilized.

According to embodiments disclosed herein, capacities of purchased compute resources provided by web services platform 808 can be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 808 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 9 depicts a computing system diagram that illustrates one configuration for datacenter 802 that implements web services platform 808. With regards to elements of the web services platform previously described with respect to FIG. 1, host computer 110 may be a server computer 902 of FIG. 9 (which itself may be computer 1000 of FIG. 10), host partition 112 may be an instance of instance manager 908 (where a host partition serves a hypervisor-type role), and VM instances 114A and 114B may each be an instance 906 of FIG. 9. Internal network infrastructure 108 of FIG. 1 may be local area network 916 of FIG. 9, and route optimizer 116 of FIG. 1 may be server computer 904 of FIG. 9.

The example datacenter 802 shown in FIG. 9 may include several server computers 902A-902N, which may be referred herein singularly as "server computer 902" or in the plural as "server computers 902," for providing compute resources for hosting virtual clouds and for executing applications. Server computers 902 may be standard tower or rack-mount server computers configured appropriately for providing the compute resources described above. For instance, in one implementation server computers 902 may be configured to provide instances 906A-906N of compute resources.

Instances 906A-906N, which may be referred herein singularly as "instance 906" or in the plural as "instances 906," may be virtual machine instances. As known in the art, a virtual machine instance is an instance of a software implementation of a machine (i.e., a computer) that executes programs like a physical machine. In the example of virtual machine instances, each server 902 may be configured to execute an instance manager 908 capable of executing the instances. Instance manager 908 may be a hypervisor or another type of program configured to enable the execution of multiple instances 906 on a single server 902, for example. As discussed above, each of instances 906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 802 shown in FIG. 9 may also include a server computer 904 reserved for executing software components for managing the operation of datacenter 802, server computers 902 and instances 906. In particular, server computer 904 may execute a management component 910. As discussed above, working between FIG. 8. and FIG. 9, an entity of web services platform 808 may utilize customer computing system 804 to access management component 910 to configure various aspects of the operation of web services platform 808 and instances 906 purchased by the entity. For example, the entity may purchase instances and make changes to the configuration of the instances. The entity may also specify settings regarding how the purchased instances are to be scaled in response to demand. The entity may also provide requests to launch instances to management component 910.

As also described briefly above, an auto scaling component 912 may scale instances 906 based upon rules defined by an entity of web services platform 808. For example, auto scaling component 912 may allow an entity to specify scale up rules for use in determining when new instances should be instantiated and scale down rules for use in determining when existing instances should be terminated.

As discussed briefly above, datacenter 802 may also be configured with a deployment component 914 to assist entities in the deployment of new instances 906 of compute resources. Deployment component 914 may receive a configuration from an entity that includes data describing how new instances 906 should be configured. For example, the configuration may specify one or more applications that should be installed in new instances 906, provide scripts and/or other types of code to be executed for configuring new instances 906, provide cache warming logic specifying how an application cache should be prepared, and other types of information.

Deployment component 914 may utilize the entity-provided configuration and cache warming logic to configure, prime, and launch new instances 906. The configuration, cache warming logic, and other information may be specified by an entity using management component 910 or by providing this information directly to deployment component 914. Other mechanisms may also be utilized to configure the operation of deployment component 914.

In the example datacenter 802 shown in FIG. 9, an appropriate LAN 916 may be utilized to interconnect server computers 902A-902N and server computer 904. LAN 916 may also be connected to WAN 806 illustrated in FIG. 8. It should be appreciated that the network topology illustrated in FIGS. 8 and 9 has been greatly simplified and that many more networks and networking devices may be utilized to interconnect the various computing systems disclosed herein. Appropriate load balancing devices or software modules may also be utilized for balancing a load between each of datacenters 802A-802N, between each of server computers 902A-902N in each datacenter 802 and between instances 906 purchased by each entity of web services platform 808. These network topologies and devices should be apparent to those skilled in the art.

It should be appreciated that datacenter 802 described in FIG. 9 is merely illustrative and that other implementations may be utilized. In particular, functionality described herein as being performed by management component 910, auto scaling component 912, and deployment component 914 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

FIG. 10 depicts an example computer architecture for a computer 1000 capable of executing the above-described software components. With regard to the example web services platform described with respect to FIG. 1, host computer 110 and server print service 116, as well as customer computer A 102A and customer computer B 102B, may each be implemented in computer 1000 of FIG. 10.

The computer architecture shown in FIG. 10 illustrates a conventional server computer, workstation, desktop computer, laptop, tablet, network appliance, PDA, e-reader, digital cellular phone, or other computing node, and may be utilized to execute any aspects of the software components presented herein described as executing within datacenters 802A-802N, on server computers 902A-902N, on the customer computing system 804, or on any other computing system mentioned herein.

Computer 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. CPUs 1004 may be standard programmable processors that perform arithmetic and logical operations necessary for the operation of computer 1000.

CPUs 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 1006 may provide an interface between CPUs 1004 and the remainder of the components and devices on the baseboard. Chipset 1006 may provide an interface to a random access memory (RAM) 1008 used as the main memory in computer 1000. Chipset 1006 may further provide an interface to a computer-readable storage medium, such as a read-only memory (ROM) 1020 or non-volatile RAM (NVRAM) (not shown), for storing basic routines that may help to start up computer 1000 and to transfer information between the various components and devices. ROM 1020 or NVRAM may also store other software components necessary for the operation of computer 1000 in accordance with the embodiments described herein.

Computer 1000 may operate in a networked environment using logical connections to remote computing nodes and computer systems through LAN 1016. Chipset 1006 may include functionality for providing network connectivity through a network interface controller (NIC) 1022, such as a gigabit Ethernet adapter. NIC 1022 may be capable of connecting the computer 1000 to other computing nodes over LAN 1016. It should be appreciated that multiple NICs 1022 may be present in computer 1000, connecting the computer to other types of networks and remote computer systems.

Computer 1000 may be connected to a mass storage device 1028 that provides non-volatile storage for the computer. Mass storage device 1028 may store system programs, application programs, other program modules, and data, which have been described in greater detail herein. Mass storage device 1028 may be connected to computer 1000 through a storage controller 1024 connected to chipset 1006. Mass storage device 1028 may consist of one or more physical storage units. Storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 1000 may store data on mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 1028 is characterized as primary or secondary storage and the like.

For example, computer 1000 may store information to mass storage device 1028 by issuing instructions through storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 1000 may further read information from mass storage device 1028 by detecting the physical states or characteristics of one or more particular locations within the physical storage units.

In addition to mass storage device 1028 described above, computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 1000.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 1028 may store an operating system utilized to control the operation of the computer 1000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 1028 may store other system or application programs and data utilized by computer 1000, such as management component 1010 and/or the other software components described above.

Mass storage device 1028 or other computer-readable storage media may also be encoded with computer-executable instructions, which, when loaded into computer 1000, transforms the computer from a general-purpose computing system into a special-purpose computer capable of implementing the embodiments described herein. These computer-executable instructions transform computer 1000 by specifying how CPUs 1004 transition between states, as described above. Computer 1000 may have access to computer-readable storage media storing computer-executable instructions, which, when executed by computer 1000, may perform operating procedures depicted in FIGS. 2-7.

Computer 1000 may also include an input/output controller 1032 for receiving and processing input from a number of input devices, such as a keyboard, a mouse, a touchpad, a touch screen, an electronic stylus, or other type of input device. Similarly, input/output controller 1032 may provide output to a display, such as a computer monitor, a flat-panel display, a digital projector, a printer, a plotter, or other type of output device. It will be appreciated that computer 1000 may not include all of the components shown in FIG. 10, may include other components that are not explicitly shown in FIG. 10 or may utilize an architecture completely different than that shown in FIG. 10.

As described herein, a computing node may be a physical computing node, such as computer 1000 of FIG. 10. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway, or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for remotely printing from an application executing on a compute node of a web services platform, comprising:
a memory bearing instructions that, upon execution by a processor, cause the system at least to:
receive at an agent of the web services platform of the system an identification of a printer of a remote client compute node, the compute node having a network address and comprising a web services virtual machine executing the application based on the web services platform, wherein the web services platform provides access to the application and prevents using the network address to establish a routable connection between the remote client compute node and the compute node across a network;
store an identification that the printer is associated with the remote client compute node based at least in part on the received identification of the printer of the remote client compute node;
present a representation of the printer to the application executing on the compute node;
receive at the agent a print job from the application that is destined for the representation of the printer;
determine at the agent that the print job is to be sent to the remote client compute node based at least in part on the stored identification that the printer is associated with the remote client compute node; and
in response to determining that the print job is to be sent to the remote client compute node, send the print job to the remote client compute node without using the network address to establish a network connection between the compute node and the remote client compute node.

2. The system of claim 1, wherein the memory further bears instructions that, upon execution by the processor, cause the system at least to:
receive an identification of a second printer of the remote client compute node;
store an identification that the second printer is associated with the remote client compute node based at least in part on the received identification of the second printer of the remote client compute node;
present a representation of the second printer to the application executing on the compute node;
determine that the print job is to be sent to the remote client compute node based at least in part on a stored association that print jobs originated by the application are to be sent to the printer rather than the second printer; and send the remote client compute node an indication that the print job is to be printed with the printer rather than with the second printer.

3. A method, comprising:

receiving at a computing device an identification of a printer of a compute node;

presenting a representation of the printer to an application to which the application should send a print job associated with the compute node, wherein the application is accessible by a web services platform and executed by a web services virtual machine of the web service platform, and wherein the application has a network address that is not used to establish a routable connection between the application and compute node;

receiving at the computing device the print job from the application that is sent by the application and destined for the representation of the printer; and in response to determining by the computing device that the print job is to be sent to the compute node by determining that the representation of the printer is associated with the compute node, sending the print job to the compute node by the computing device.

4. The method of claim 3, wherein sending the print job to the compute node comprises:

sending the print job to the compute node in response to receiving a message from the compute node indicative of a query of whether there are any print jobs for the compute node.

5. The method of claim 3, wherein sending the print job to the compute node comprises:

sending the print job to the compute node in response to determining that the application has generated the print job, and independent of receiving a message from the compute node indicative of a query of whether there are any print jobs for the compute node.

6. The method of claim 3, wherein receiving the identification of the printer comprises:

receiving a request for a hypertext transfer protocol (HTTP) or HTTP secure (HTTPS) uniform resource locator (URL).

7. The method of claim 3, wherein the identification of the printer is contained within a query string of the URL.

8. The method of claim 3, further comprising:

processing a request for a hypertext transfer protocol (HTTP) or HTTP secure (HTTPS) uniform resource locator (URL) for the compute node to determine a command issued by the compute node.

9. The method of claim 3, wherein the command issued by the compute node is to cancel the print job.

10. The method of claim 3, wherein the command issued by the compute node is to print the print job.

11. The method of claim 3, wherein the command issued by the compute node is to indicate that the printer is not available for printing.

12. The method of claim 3, wherein sending the print job to the compute node comprises:

dividing the print job into a plurality of segments; and
separately sending each of the plurality of segments to the compute node.

13. The method of claim 12, wherein the plurality of segments are ordered, and wherein separately sending each of the plurality of segments to the compute node comprises:

sending an indication of an order of the plurality of segments to the compute node.

14. The method of claim 12, wherein dividing the print job into the plurality of segments comprises:

determining a size of a segment of the plurality of segments based at least in part on at least one of a speed at which the print job is generated by the application, a speed at which the compute node may print the print job, and a bandwidth of a communications link with the compute node.

15. A non-transitory computer-readable storage medium, bearing instructions that, when executed on a first compute node, cause the first compute node to perform operations comprising:

receiving at the first compute node an identification of a printer of a second compute node;

presenting a representation of the printer to an application, wherein the application is accessible by a web services platform that includes the first compute node and is executed by a web services virtual machine of the web service platform, and wherein the application has a network address that is not used to establish a routable connection between the application and the second compute node;

receiving at the first compute node a print job from the application that is destined for the representation of the printer; and in response to determining that the print job is to be sent to the second compute node, sending the print job to the second compute node.

16. The non-transitory computer-readable storage medium of claim 15, further bearing instructions that, when executed on the first compute node, cause the first compute node to perform operations comprising:

before sending the print job to the second compute node, verifying that a user account associated with the second compute node has permission to receive print jobs generated from the application.

17. The non-transitory computer-readable storage medium of claim 15, further bearing instructions that, when executed on the first compute node, cause the first compute node to perform operations comprising:

receiving an identification of a second printer of the second compute node;

presenting a representation of the second printer to the application;

determining that the print job is to be sent to the second compute node based at least in part on a stored association that print jobs originated by the application are to be sent to the printer rather than the second printer; and sending the second compute node an indication that the print job is to be printed with the printer rather than with the second printer.

18. The non-transitory computer-readable storage medium of claim 15, further bearing instructions that, when executed on the first compute node, cause the first compute node to perform operations comprising:

receiving an identification of a second printer of the second compute node; and sending the second compute node an indication that the print job is to be printed with both the printer and with the second printer.

19. The non-transitory computer-readable storage medium of claim 15, further bearing instructions that, when executed on the first compute node, cause the first compute node to perform operations comprising:

receiving an identification of a second printer of a third compute node; and wherein sending the print job to the second compute node comprises sending the print job to the third compute node.

20. The non-transitory computer-readable storage medium of claim 15, further bearing instructions that, when executed on the first compute node, cause the first compute node to perform operations comprising:
  receiving an identification of a second printer of the second compute node; and
  determining that the print job is to be printed with the printer rather than the second printer based at least in part on a type of document of the print job.

21. The non-transitory computer-readable storage medium of claim 15, further bearing instructions that, when executed on the first compute node, cause the first compute node to perform operations comprising:
  receiving an identification of a second printer of the second compute node; and
  determining that the print job is to be printed with the printer rather than the second printer based at least in part on a size of the print job.

22. The non-transitory computer-readable storage medium of claim 15, further bearing instructions that, when executed on the first compute node, cause the first compute node to perform operations comprising:
  receiving an identification of a second printer of the second compute node; and
  determining that the print job is to be printed with the printer rather than the second printer based at least in part on a stored association that print jobs generated by the application are to be printed with the printer.

23. The non-transitory computer-readable storage medium of claim 15, further bearing instructions that, when executed on the first compute node, cause the first compute node to perform operations comprising:
  compressing the print job before sending the print job to the second compute node.

24. The non-transitory computer-readable storage medium of claim 15, further bearing instructions that, when executed on the first compute node, cause the first compute node to perform operations comprising:
  encrypting the print job before sending the print job to the second compute node.

* * * * *